(12) United States Patent
Takii

(10) Patent No.: US 11,143,580 B2
(45) Date of Patent: Oct. 12, 2021

(54) MATERIAL TESTING MACHINE

(71) Applicant: Shimadzu Corporation, Kyoto (JP)

(72) Inventor: Tadaoki Takii, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 2 days.

(21) Appl. No.: 16/885,273

(22) Filed: May 28, 2020

(65) Prior Publication Data

US 2021/0080365 A1    Mar. 18, 2021

(30) Foreign Application Priority Data

Sep. 17, 2019  (JP) .............................. JP2019-168380

(51) Int. Cl.
*G01N 3/04* (2006.01)
*G01N 3/02* (2006.01)
(Continued)

(52) U.S. Cl.
CPC .................. *G01N 3/20* (2013.01); *G01N 3/32* (2013.01); *G01N 2203/0008* (2013.01); *G01N 2203/0023* (2013.01); *G01N 2203/04* (2013.01)

(58) Field of Classification Search
CPC ............. G01N 3/08; G01N 2203/0204; G01N 2203/0012; G01N 2203/0441; G01N 3/02;
(Continued)

(56) References Cited

U.S. PATENT DOCUMENTS

| 8,646,345 B2 * | 2/2014 | Israelachvili ............ G01N 1/00 73/864.91 |
| 9,588,009 B2 * | 3/2017 | Matsuura ................ G01N 29/04 |
| 2017/0045431 A1 * | 2/2017 | Komine .................... G01N 3/04 |

FOREIGN PATENT DOCUMENTS

| DE | 102012110811 | 5/2014 |
| JP | 2016020879 | 2/2016 |

(Continued)

OTHER PUBLICATIONS

Daniel Backe, et al., "Fatigue testing of CFRP in the Very High Cycle Fatigue (VHCF) regime at ultrasonic frequencies." Composites Science and Technology, vol. 106, Jan. 16, 2015, pp. 93-99.

(Continued)

*Primary Examiner* — Brandi N Hopkins
(74) *Attorney, Agent, or Firm* — JCIPRNET

(57) ABSTRACT

Provided is a material testing machine capable of giving an appropriate testing force to a testing piece. The material testing machine performs a three-point bending test on a testing piece and includes a support mechanism that supports the testing piece, an indenter that is connected to an ultrasonic oscillator and gives ultrasonic vibration to the testing piece by abutting against the testing piece, and a load mechanism that presses the indenter to the testing piece supported by the support mechanism. The support mechanism includes: a spherical seat that has a lower member equipped with a spherical-surface-shaped concave portion or convex portion, and an upper member equipped with a spherical-surface-shaped concave portion or convex portion having a shape corresponding to the concave portion or convex portion in the lower member; a holding portion; and a first movable member.

4 Claims, 5 Drawing Sheets

(51) Int. Cl.
*G01N 3/20* (2006.01)
*G01N 3/32* (2006.01)

(58) Field of Classification Search
CPC .. G01N 3/20; G01N 3/32; G01N 3/04; G01N 3/34; G01N 33/38; G01N 3/06; G01N 2203/0008; G01N 2203/0023; G01N 2203/04
See application file for complete search history.

(56) References Cited

FOREIGN PATENT DOCUMENTS

| | | |
|---|---|---|
| JP | 5880733 | 3/2016 |
| KR | 101161524 | 7/2012 |

OTHER PUBLICATIONS

"Search Report of Europe Counterpart Application", dated Oct. 21, 2020, p. 1-p. 8.

* cited by examiner

MATERIAL TESTING MACHINE

CROSS-REFERENCE TO RELATED APPLICATION

This application claims the priority benefit of Japan Application No. 2019-168380, filed on Sep. 17, 2019. The entirety of the above-mentioned patent application is hereby incorporated by reference herein and made a part of this specification.

BACKGROUND

Technical Field

The disclosure relates to a material testing machine.

Related Art

A material testing machine which performs a three-point bending test on a testing piece has been used (for example, see patent literature 1). In addition, an ultrasonic fatigue testing machine which resonates a testing piece by ultrasonic waves to perform a fatigue test has been used (for example, see patent literature 2).

Furthermore, in recent years, a material test for executing the three-point bending test in a state of giving ultrasonic vibration and a pressing force to a testing piece consisting of carbon fiber reinforced plastic (CFRP) has also been studied (see non-patent literature 1).

In the case of giving ultrasonic vibration and a pressing force to a testing piece, due to the production precision of an indenter that presses the testing piece, the production precision of a bending bearing that supports the testing piece, or the production precision of the testing piece itself, contact surfaces of the indenter and the testing piece may not be parallel. When this phenomenon occurs, there is a problem that an appropriate material test cannot be performed because a uniform testing force cannot be loaded on the testing piece, local breakage is generated, and the like.

LITERATURES OF PAST

Patent Literature

[Patent literature 1] Japanese Patent Laid-Open No. 2016-20879
[Patent literature 2] Japanese Patent No. 5880733

Non-patent literature

[Non-patent literature 1] Composites Science and Technology, Volume 106, 93-99, "Fatigue testing of CFRP in the Very High Cycle Fatigue (VHCF) regime at ultrasonic frequencies"

SUMMARY

The disclosure provides a material testing machine capable of giving an appropriate testing force to a testing piece.

A first aspect of the disclosure is a material testing machine which performs a three-point bending test on a testing piece, the material testing machine including a support mechanism that supports the testing piece, an indenter that is connected to an ultrasonic oscillator and gives ultrasonic vibration to the testing piece by abutting against the testing piece, and a load mechanism that presses the indenter to the testing piece supported by the support mechanism; the support mechanism including: a spherical seat that has a lower member equipped with a spherical-surface-shaped concave portion or convex portion, and an upper member equipped with a spherical-surface-shaped concave portion or convex portion having a shape corresponding to the concave portion or convex portion in the lower member; a holding portion that supports the testing piece on the upper member; and a first movable member that causes the upper member to slide along the spherical surface with respect to the lower member.

According to the first aspect of the disclosure, by causing the upper member to slide along the spherical surface with respect to the lower member, arrangement of the testing piece and the indenter can be adjusted appropriately. Thereby, it is possible to give a uniform and appropriate testing force to the testing piece.

DESCRIPTION OF THE EMBODIMENTS

Figure 1:
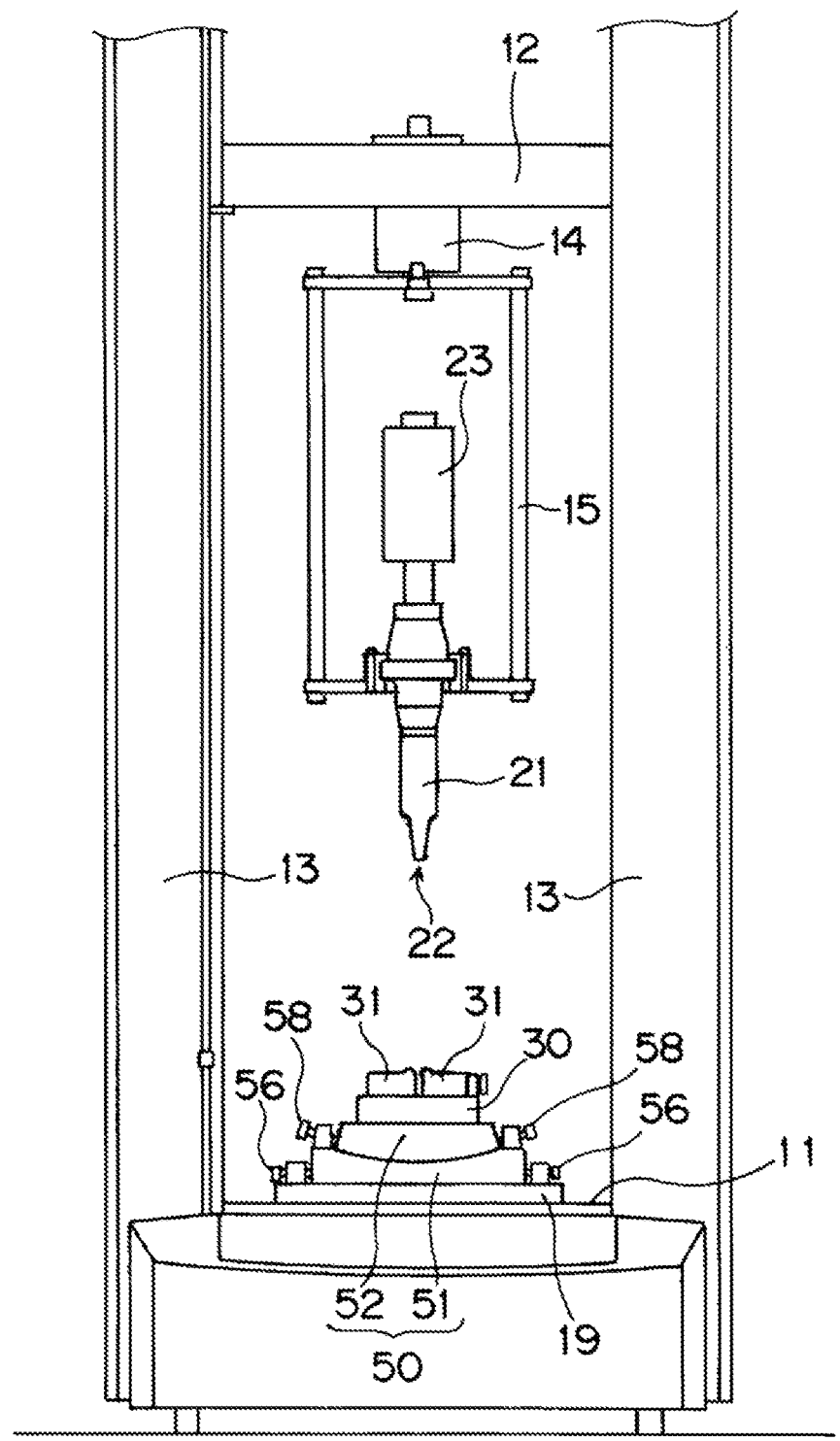
FIG. 1 is a front view of a material testing machine of an embodiment of the disclosure.

Hereinafter, an embodiment of the disclosure is described based on the drawings. FIG. 1 is a front view of a material testing machine of the embodiment of the disclosure.

The material testing machine includes an abutment 11 and a crosshead 12 that goes up and down with respect to the abutment 11. Screw bars which rotate synchronously due to driving of a motor (not shown) are arranged in a pair of left and right covers 13 erected on the abutment 11, and a pair of nuts arranged at both ends of the crosshead 12 is screwed with the screw bars. Therefore, the crosshead 12 goes up and down due to the driving of the motor.

A support frame 15 is attached to the crosshead 12 via a load cell 14. On the support frame 15, an ultrasonic oscillator 23 and a horn 21 that amplifies ultrasonic waves originated from the ultrasonic oscillator 23 are arranged. The lower end of the horn 21 becomes an indenter 22 which abuts against a testing piece 100 (see FIGS. 2 and 4 described later) and presses the testing piece 100 to thereby give ultrasonic vibration and a testing force to the testing piece 100. The indenter 22 is coupled to the crosshead 12 via the horn 21, the support frame 15, and the load cell 14.

A spherical seat 50 and a holding portion 30 are arranged on the base plate 19 fixed to the abutment 11, the spherical seat 50 having a lower member 51 equipped with a spherical-surface-shaped concave portion and an upper member 52 equipped with a spherical-surface-shaped convex portion having a shape corresponding to the concave portion in the lower member 51, the holding portion 30 having a pair of support points 31 for supporting the testing piece 100 arranged on the upper member 52 in the spherical seat 50. The spherical seat 50 and the holding portion 30 constitute a support mechanism that supports the testing piece 100.

Figure 2:
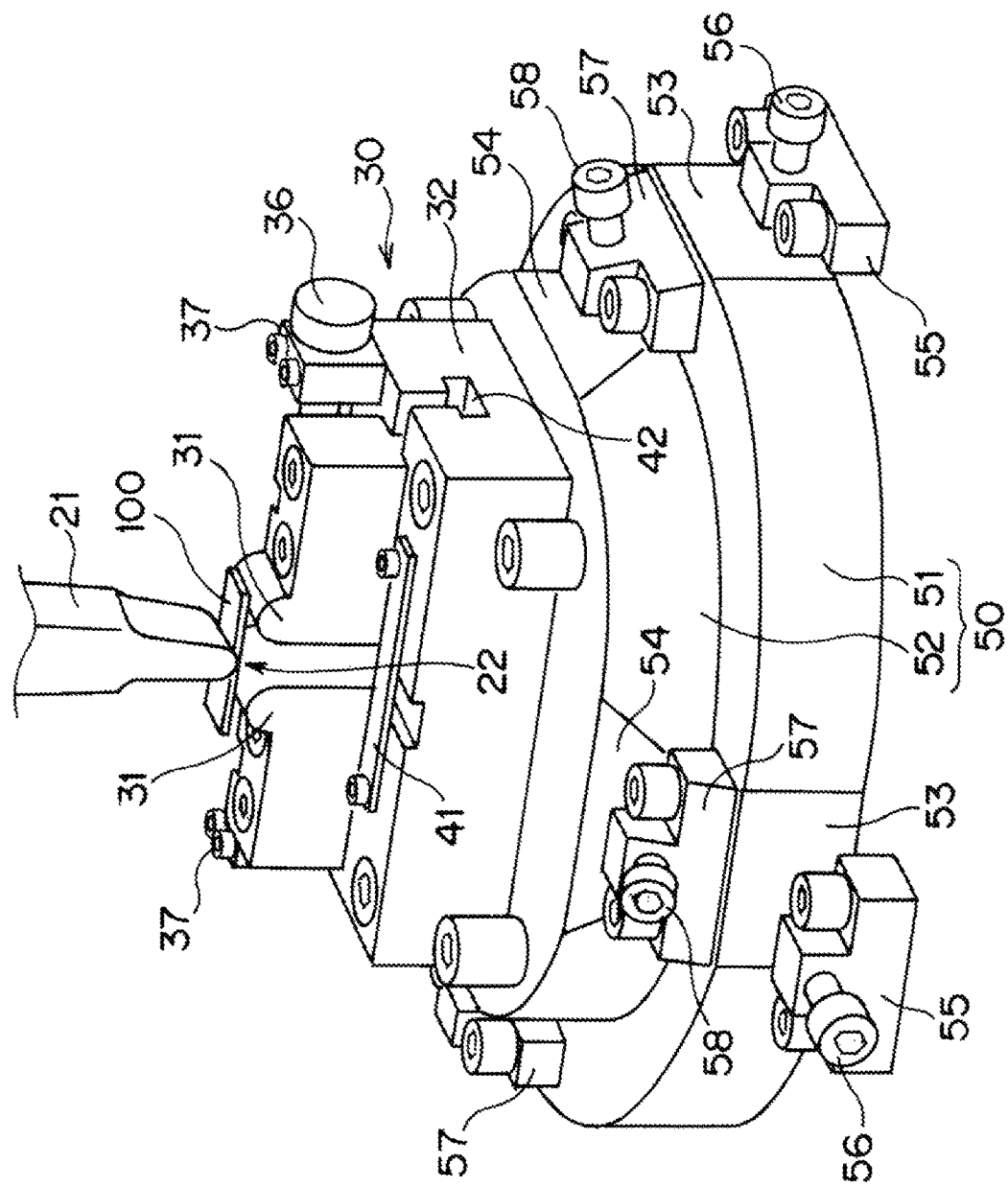
FIG. 2 is a perspective view of a spherical seat 50 and a holding portion 30.
Figure 3:
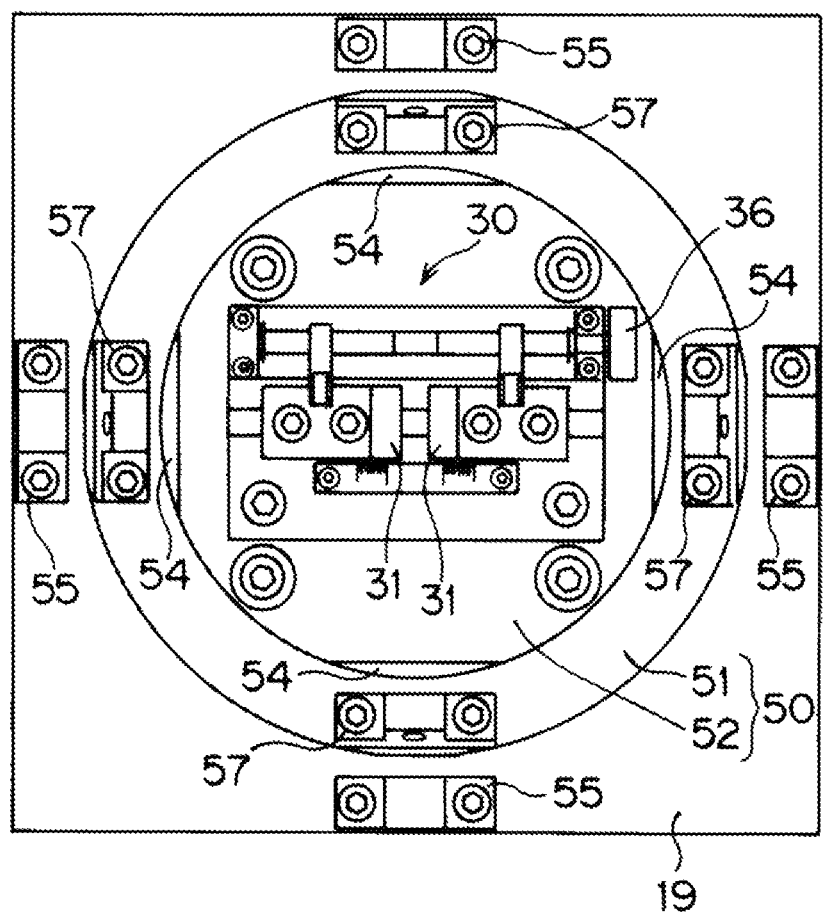
FIG. 3 is a plan view of the the spherical seat 50 and the holding portion 30 arranged on a base plate 19.

FIG. 2 is a perspective view of the spherical seat 50 and the holding portion 30, and FIG. 3 is a plan view of the spherical seat 50 and the holding portion 30 arranged on the base plate 19.

As described above, the spherical seat 50 includes the lower member 51 equipped with a spherical-surface-shaped concave portion and the upper member 52 equipped with a spherical-surface-shaped convex portion having a shape corresponding to the concave portion in the lower member 51. In the spherical seat 50, an angle of the upper surface of the upper member 52 can be adjusted by causing the upper member 52 to slide with respect to the lower member 51.

Besides, in the above-described embodiment, the spherical seat 50 has been used which includes the lower member 51 equipped with a spherical-surface-shaped concave portion and the upper member 52 equipped with a spherical-surface-shaped convex portion having a shape corresponding to the concave portion in the lower member 51, but a spherical seat may also be used which includes a lower member equipped with a spherical-surface-shaped convex portion and an upper member equipped with a spherical-surface-shaped concave portion having a shape corresponding to the convex portion in the lower member.

On the lower member 51, four screw receiving members 57 are arranged at equal intervals to surround the upper member 52. A screw 58 screwed with each screw receiving member 57 abuts against an inclination surface 54 formed on the upper member 52 while facing a normal line direction of the inclination surface 54. Therefore, by adjusting the four screws 58, it is possible to cause the upper member 52 to slide with respect to the lower member 51 and to fix the upper member 52 to the lower member 51. The screws 58, the screw receiving members 57 and the like constitute a first movable member that causes the upper member 52 to slide with respect to the lower member 51 along the spherical surfaces thereof.

On the base plate 19, four screw receiving members 55 are arranged at equal intervals to surround the lower member 51. A screw 56 screwed with each screw receiving member 55 abuts, from the horizontal direction, against a surface 53 facing the vertical direction and formed on the lower member 51. Therefore, by adjusting the four screws 56, it is possible to cause the lower member 51 to move in the horizontal direction on the base plate 19. Besides, because the direction in which the indenter 22 presses the testing piece 100, that is, an application direction of the testing force faces the vertical direction, the lower member 51 moves on a plane orthogonal to the direction in which the testing piece 100 is pressed. The screws 56, the screw receiving members 55 and the like constitute a second movable member that causes the spherical seat 50 to move on the plane orthogonal to the direction in which the testing piece 100 is pressed.

Figure 4:
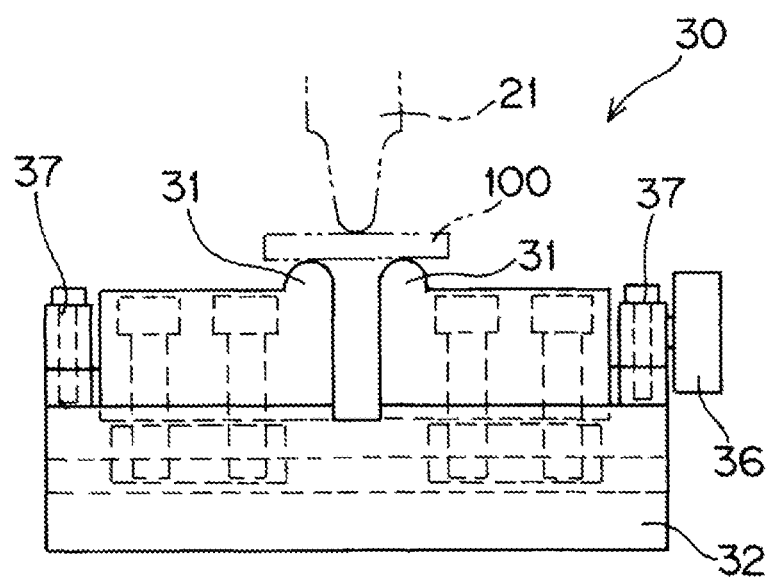
FIG. 4 is a front view of the holding portion 30.
Figure 5:
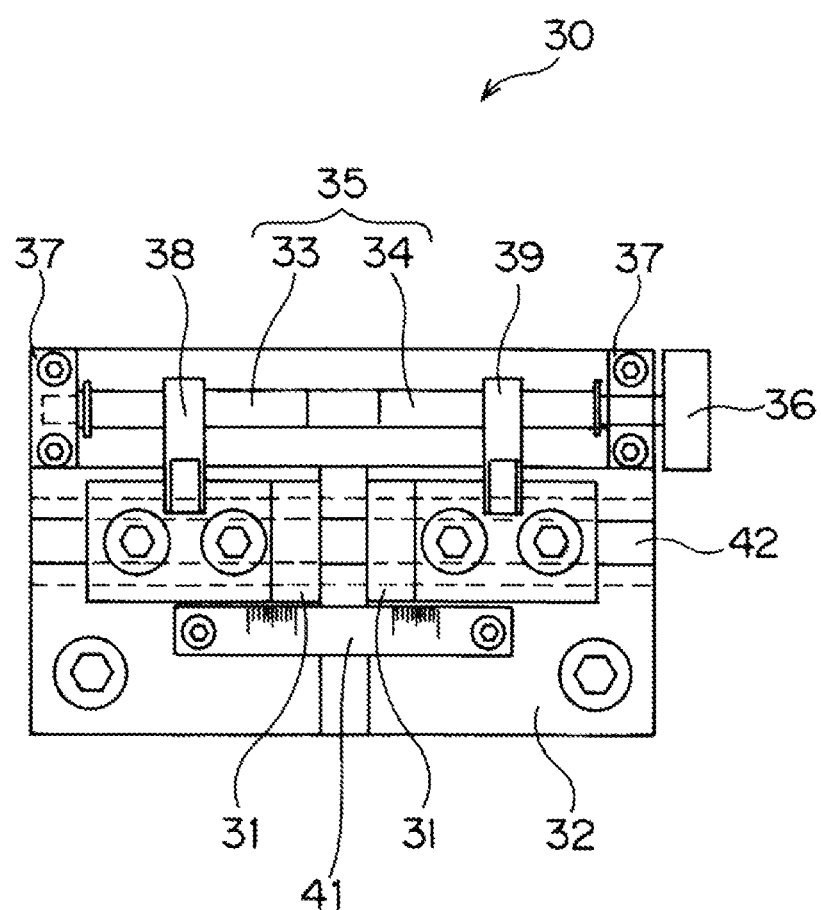
FIG. 5 is a plan view of the holding portion 30.

FIG. 4 is a front view of the holding portion 30, and FIG. 5 is a plan view of the holding portion 30. Besides, in FIG. 4, illustration of the screws 56 and the screws 58 are omitted.

The holding portion 30 is configured to support the testing piece 100 by the pair of support points 31 on the upper member 52. As shown in FIGS. 2, 4 and 5, the holding portion 20. 30 includes a base 32 fixed to the upper surface of the upper member 52 in the spherical seat 50. A groove portion 42 is formed in the base 32, and the pair of support points 31 is partially disposed in the groove portion 42 and is movable along the groove portion 42. On a lateral side of the pair of support points 31, a screw bar 35 having a handle 36 at one end is arranged. In addition, on the lateral side opposite to the screw bar 35 of the pair of support points 31, a gauge 41 for confirming the distance between the pair of support points 31 is arranged.

The screw bar 35 is supported by a pair of bearing portions 37 to be rotatable. A first screw region 33 and a second screw region 34 serving as inverted screws are formed on the screw bar 35. The first screw region 33 is screwed with a coupling member 38 coupled to one support point 31. On the other hand, the second screw region 34 is screwed with a coupling member 39 coupled to the other support point 31. Thereby, when an operator rotates the handle 36, the pair of support points 31 moves in directions in which the support points 31 get close to each other or moves in directions in which the support points 31 are separated from each other. The screw bar 35, the coupling members 38, 39 and the like constitute a third movable member that causes the pair of support points 31 to move in directions in which the support points 31 get close or separate from each other.

Next, description is given to operations during execution of a three-point test in a state of giving ultrasonic vibration and a pressing force to the testing piece 100 in a material testing machine having the above configuration. Besides, in this embodiment, carbon fiber reinforced plastic is used as the testing piece 100.

When the test is started, first, the handle 36 is rotated to adjust the distance between the pair of support points 31, and then the testing piece 100 is placed on the pair of support points 31. In addition, by adjusting the four screws 58 surrounding the upper member 52 in the spherical seat 50, the upper member 52 is caused to slide with respect to the lower member 51 and the angle of the upper surface of the upper member 52 is adjusted. At this time, in opposite screws among the four screws 58, one screw 58 is loosened and the other screw 58 is fastened. Thereby, the angle formed by the front surface of the testing piece 100 placed on the pair of support points 31 and the direction of the testing force given from the indenter 22 to the testing piece 100 is adjusted to a predetermined angle (normally 90 degrees).

Next, by adjusting the four screws 56 surrounding the lower member 51 in the spherical seat 50, the lower member 51 is caused to move on the base plate 19. At this time, in opposite screws among the four screws 56, one screw 56 is loosened and the other screw 56 is fastened. Thereby, the position at which the testing piece 100 abuts against the indenter 22 is adjusted to a position suitable for performing the material test on the plane orthogonal to the direction in which the testing force is applied to the testing piece 100 by the indenter 22.

In this state, the crosshead 12 is lowered by the driving of the motor (not shown), and the testing piece 100 is pressed by the indenter 22. The testing force to the testing piece 100 is measured by the load cell 14. In a state that a preset testing force is loaded on the testing piece 100, ultrasonic waves are oscillated from the ultrasonic oscillator 23. The ultrasonic waves originated from the ultrasonic oscillator 23 are amplified by the horn 21. Besides, the horn 21 is designed so that a stomach position of stationary waves in the ultrasonic waves oscillated from the ultrasonic oscillator 23 is disposed at the lower end of the indenter 22. Thereby, the three-point bending test is executed in the state that the pressing force is loaded on and the ultrasonic vibration is given to the testing piece 100.

Besides, in the above-described embodiment, the case is described in which a holding portion configured to support the testing piece 100 by the pair of support points 31 is used as the holding portion 30 to execute the three-point bending test, but the configuration of the holding portion 30 may be changed, and a four-point bending test or a cantilever bending test may be executed on the testing piece 100.

It is understood by those skilled in the art that the embodiment illustrated above is a specific example of the following aspect.

(Item 1)

A material testing machine which performs a three-point bending test on a testing piece and includes a support mechanism that supports the testing piece, an indenter that is connected to an ultrasonic oscillator and gives ultrasonic vibration to the testing piece by abutting against the testing piece, and a load mechanism that presses the indenter to the testing piece supported by the support mechanism; wherein the support mechanism includes: a spherical seat that has a lower member equipped with a spherical-surface-shaped concave portion or convex portion, and an upper member equipped with a spherical-surface-shaped concave portion or convex portion having a shape corresponding to the concave portion or convex portion in the lower member; a holding portion that supports the testing piece on the upper member; and a first movable member that causes the upper member to slide along the spherical surface with respect to the lower member.

According to the material testing machine of Item 1, by causing the upper member to slide along the spherical surface with respect to the lower member, arrangement of the testing piece and the indenter can be adjusted appropriately. Thereby, it is possible to give a uniform and appropriate testing force to the testing piece.

(Item 2)

The material testing machine of Item 1 further includes a second movable member that causes the spherical seat to move on a plane orthogonal to a direction in which the testing piece is pressed by the load mechanism.

According to the material testing machine of Item 2, a position at which the testing force is applied to the testing piece can be adjusted. Therefore, even when the position of the testing piece is moved due to the adjustment using the spherical seat, the application position of the testing force can also be set to an appropriate position.

(Item 3)

In the material testing machine of Item 1, the holding portion includes a pair of support points for supporting the testing piece at positions separated from each other and a third movable member that causes the pair of support points to move in directions in which the support points get close or separate from each other.

According to the material testing machine of Item 3, it is possible to adjust the distance between the pair of support points and properly execute a three-point bending test.

(Item 4)

The material testing machine of Item 1 includes a crosshead that goes up and down with respect to the support mechanism, wherein the indenter is coupled to the crosshead via a horn that amplifies ultrasonic waves oscillated by the ultrasonic oscillator.

According to the material testing machine of Item 4, it is possible to execute a material test while giving an appropriate testing force to the testing piece by movement of the crosshead.

Besides, the above description is illustrative for the embodiment of the disclosure but not restrictive for the disclosure.

What is claimed is:

1. A material testing machine, which performs a three-point bending test on a testing piece, comprising:
    a support mechanism that supports the testing piece,
    an indenter that is connected to an ultrasonic oscillator and gives ultrasonic vibration to the testing piece by abutting against the testing piece, and
    a load mechanism that presses the indenter to the testing piece supported by the support mechanism;
    wherein the support mechanism comprises:
    a spherical seat that has a lower member equipped with a spherical-surface-shaped concave portion or convex portion, and an upper member equipped with a spherical-surface-shaped concave portion or convex portion having a shape corresponding to the concave portion or convex portion in the lower member;
    a holding portion that supports the testing piece on the upper member; and
    a first movable member that causes the upper member to slide along the spherical surface with respect to the lower member.

2. The material testing machine according to claim 1, further comprising
    a second movable member that causes the spherical seat to move on a plane orthogonal to a direction in which the testing piece is pressed by the load mechanism.

3. The material testing machine according to claim 1, wherein the holding portion comprises:
    a pair of support points for supporting the testing piece at positions separated from each other, and
    a third movable member that causes the pair of support points to move in directions in which the support points get close or separate from each other.

4. The material testing machine according to claim 1, comprising
    a crosshead that goes up and down with respect to the support mechanism,
    wherein the indenter is coupled to the crosshead via a horn that amplifies ultrasonic waves oscillated by the ultrasonic oscillator.

* * * * *